United States Patent
Nitsuma et al.

(10) Patent No.: US 12,143,841 B2
(45) Date of Patent: Nov. 12, 2024

(54) SIGNAL ANALYSIS DEVICE AND SIGNAL ANALYSIS RESULT DISPLAY METHOD

(71) Applicant: ANRITSU CORPORATION, Kanagawa (JP)

(72) Inventors: Yuki Nitsuma, Kanagawa (JP); Takaaki Kamisawa, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 563 days.

(21) Appl. No.: 17/565,562

(22) Filed: Dec. 30, 2021

(65) Prior Publication Data
US 2022/0303798 A1   Sep. 22, 2022

(30) Foreign Application Priority Data
Mar. 17, 2021   (JP) ................. 2021-044118

(51) Int. Cl.
*H04W 24/08*   (2009.01)
*H04L 43/045*   (2022.01)

(52) U.S. Cl.
CPC .......... *H04W 24/08* (2013.01); *H04L 43/045* (2013.01)

(58) Field of Classification Search
CPC ............................ H04W 24/08; H04L 43/045
See application file for complete search history.

(56) References Cited

FOREIGN PATENT DOCUMENTS

JP   2007-104294 A   4/2007

*Primary Examiner* — Natasha W Cosme
(74) *Attorney, Agent, or Firm* — Pearne & Gordon LLP

(57) ABSTRACT

The base station simulator 10 as a signal analysis device performs communication with the UE 70 by simulating a base station to test the operation of the communication function of the UE 70, and includes a reception unit 21*a* that receives a signal to be measured modulated by an OFDM method from the UE 70; an analog signal processing unit 22 that calculates signal data of the signal to be measured received by the reception unit 21*a*; a data analysis unit 27*c* that calculates power of the signal data for each frequency in each time, based on the signal data; and an analysis result display unit 28*c* that displays a distribution of the power of the signal data on a time axis and a frequency axis.

11 Claims, 9 Drawing Sheets

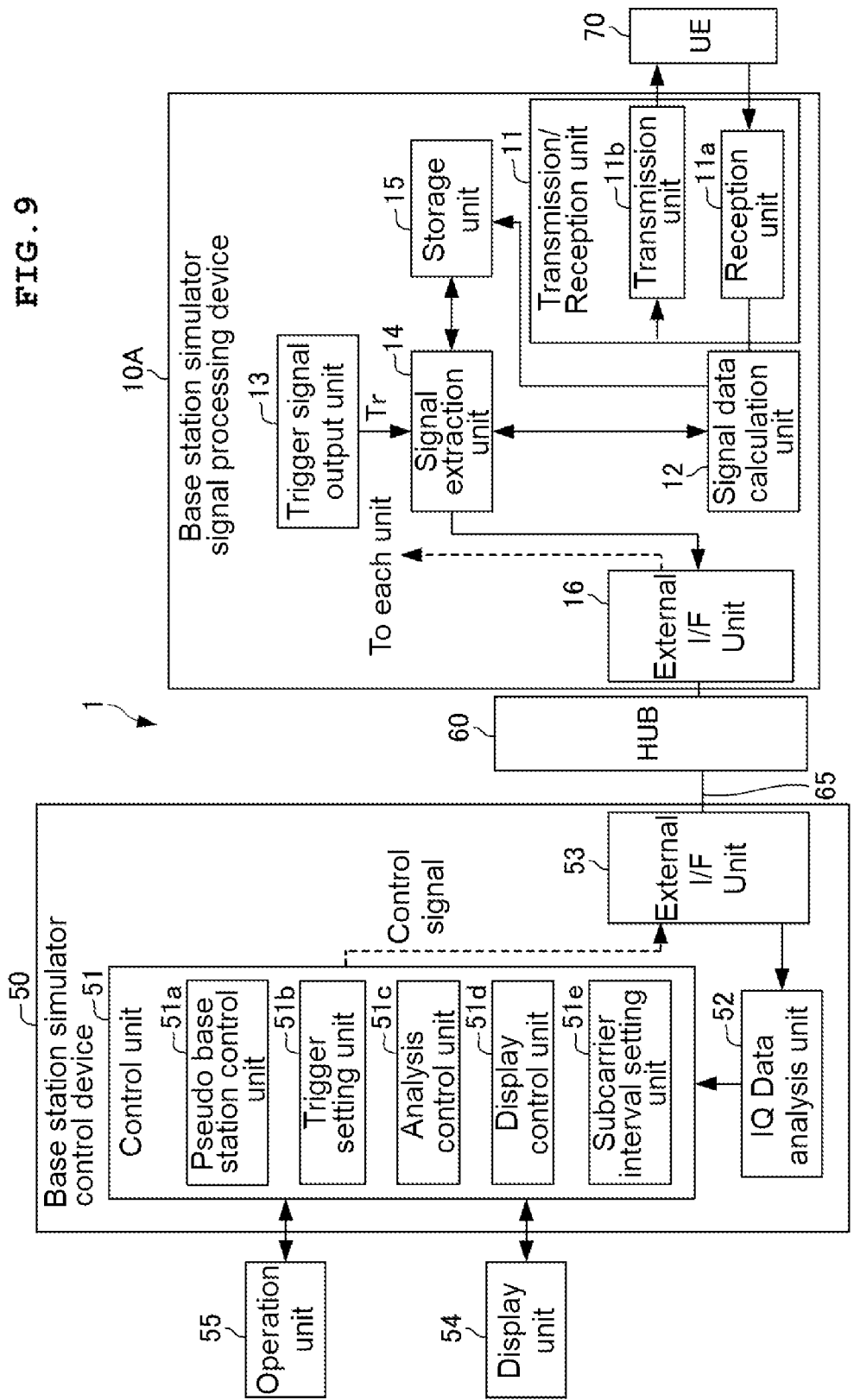

SIGNAL ANALYSIS DEVICE AND SIGNAL ANALYSIS RESULT DISPLAY METHOD

TECHNICAL FIELD

The present invention relates to a signal analysis device having a function of receiving and analyzing a signal to be measured transmitted from a mobile terminal and displaying the analysis result when testing the mobile terminal by simulating a base station, and a signal analysis result display method.

BACKGROUND ART

For example, in a mobile phone system, with the multi-functionalization of the mobile terminals, the wireless communication speed with mobile terminals and a wireless base station (hereinafter referred to as a base station) has been increased. In recent years, for example, technological development for shifting from 4th generation (4G) services that employ the LTE-Advanced method or the like to 5th generation (5G) services is progressing.

Against this background, new models of mobile communication terminals (hereinafter referred to as mobile terminals) such as mobile phones have been developed one after another, and it is necessary to test whether or not the newly developed mobile terminals operate normally.

As a device used for testing a mobile terminal, for example, a modulation signal analysis device having a function of receiving a modulation signal to be analyzed from a pseudo base station to the mobile terminal to be tested, executing signal analysis of each analysis item designated in advance by the operator is executed, and displaying the analysis result of each analysis item on a display unit has been known in the related art (for example, Patent Document 1 and the like).

RELATED ART DOCUMENT

Patent Document

[Patent Document 1] JP-A-2007-104294

DISCLOSURE OF THE INVENTION

Problem that the Invention is to Solve

In the modulation signal analysis device described in Patent Document 1, for example, when modulation accuracy (EVM) is designated as an analysis item, the analysis result of EVM and the determination result of abnormality determination of EVM are displayed at the same time (Paragraph 0056). As an example, as the "EVM measurement result", there is an example in which the maximum value and the average value of EVM and the "error" indicating that the abnormality determination result is abnormal are displayed at the same time (see FIG. 9).

According to the display control of the signal analysis result in the modulation signal analysis device described in Patent Document 1, the operator can recognize the measured value of the designated analysis item and whether the analysis item is normal or abnormal.

However, in the modulation signal analysis device described in Patent Document 1, no consideration is given to the function of displaying the power distribution of the signal data of an input modulation signal for a frequency in a time domain. Therefore, in the modulation signal analysis device described in Patent Document 1, there is a problem that determination as to whether or not a signal within a standby range is normally received, or whether or not a signal outside the standby range is output is not performed and it is difficult to specify a problem regarding what time domain and what frequency in which reception causes the abnormality.

The present invention has been made to solve such a problem in the related art, and an object of the present invention is to provide a signal analysis device and a signal analysis result display method capable of easily specifying the cause of a problem while checking the power distribution for a frequency in a time domain, with respect to a signal data of a signal to be measured.

Means for Solving the Problem

In order to solve the above problems, a signal analysis device according to claim 1 of the present invention includes a reception unit (21a) that receives a signal to be measured modulated by an OFDM method; a signal data calculation unit (22) that calculates signal data of the signal to be measured received by the reception unit; a power calculation unit (27c) that calculates power of the signal data for each frequency in each time based on the signal data; and a display unit (28c) that displays a distribution of the power of the signal data on a time axis and a frequency axis.

With this configuration, the signal analysis device according to claim 1 of the present invention can grasp the reception status of the signal data for each frequency in each time domain, by checking the power distribution of the signal data displayed on the time axis and the frequency axis, which makes it easier to specify the problem related to the occurrence of an abnormality when the abnormality occurs.

In the signal analysis device according to claim 2 of the present invention, the time axis may have a symbol forming a predetermined slot as a unit, and the frequency axis may have a resource block as a unit.

With this configuration, the signal analysis device according to claim 2 of the present invention can grasp the reception status for each resource block in each symbol of the signal data by checking the power distribution of the displayed signal data, and can quickly grasp the problematic symbols and resource blocks when an abnormality occurs.

In the signal analysis device according to claim 3 of the present invention, the distribution of the power may be displayed in a predetermined shade of color. With this configuration, the signal analysis device according to claim 3 of the present invention can easily grasp the reception status for each resource block in each symbol of the signal data by checking the power distribution of the displayed signal data, by the shade of color.

In the signal analysis device according to claim 4 of the present invention, the distribution of the power may be displayed in a plurality of colors corresponding to values of the power.

With this configuration, the signal analysis device according to claim 4 of the present invention can grasp the power value for each resource block in each symbol of the signal data by checking the power distribution of the displayed signal data, by the shade of the color displayed, which makes it easier to specify the problem when an abnormality occurs.

In the signal analysis device according to claim 5 of the present invention, power magnitudes of signals of PUSCH, PUCCH0, PUCCH1, and PUCCH2 waiting in the same slot and other signals assigned to an outside of a reception standby range other than the signals may be displayed in shades of the plurality of colors displaying the distribution of the power.

With this configuration, the signal analysis device according to claim 5 of the present invention can easily specify problems such as other signals being output outside the standby range, by checking the power distribution of the signal data displayed.

The signal analysis device according to claim 6 of the present invention further includes: a trigger signal output unit (25) that outputs a trigger signal at a predetermined timing when a predetermined trigger condition is satisfied; and a signal extraction unit (26) that receives the trigger signal, and extracts IQ data in a predetermined section according to the predetermined timing from the signal data, in which the power calculation unit calculates power for signal data of the predetermined section extracted by the signal extraction unit, and the display unit displays a power distribution for the signal data of the predetermined section extracted by the signal extraction unit.

With this configuration, the signal analysis device according to claim 6 of the present invention can analyze only the signal data in a predetermined section satisfying the trigger condition to display the analysis result, and checks the power distribution of the displayed signal data, which makes it easier to specify the problem related to the occurrence of an abnormality when an abnormality occurs in the signal data in the predetermined section.

In order to solve the above problems, a signal analysis result display method according to claim 7 of the present invention includes a reception step (S12) of receiving a signal to be measured modulated by an OFDM method; a signal data calculation step (S13) of calculating signal data of the signal to be measured received in the reception step; a power calculation step (S19) of calculating power of the signal data for each frequency in each time based on the signal data; and a display step (S21) of displaying a distribution of the power of the signal data on a time axis and a frequency axis, on the display unit (28c).

With this configuration, the signal analysis result display method according to claim 7 of the present invention, by using the signal analysis device to which the present method is applied, can grasp the reception status of the signal data for each frequency in each time domain, by checking the power distribution of the signal data displayed on the time axis and the frequency axis, which makes it easier to specify the problem related to the occurrence of an abnormality when the abnormality occurs.

Advantage of the Invention

The present invention can provide a signal analysis device and a signal analysis result display method capable of easily specifying the cause of a problem while checking the power distribution for a frequency in a time domain, with respect to a signal data of a signal to be measured.

BRIEF DESCRIPTION OF THE DRAWINGS

FIG. 5A shows a timing relationship between the start and end of storage of IQ data and a trigger signal in the ring buffer memory, and FIG. 5B shows the timing of the trigger signal in the storage range of the IQ data.

FIG. 9 is a block diagram showing a configuration of a signal analysis device according to a second embodiment of the present invention.

BEST MODE FOR CARRYING OUT THE INVENTION

Hereinafter, embodiments of a signal analysis device and a signal analysis result display method according to the present invention will be described with reference to the drawings.

First Embodiment

In the first embodiment, an example in which a signal analysis device of the present invention is applied to a base station simulator that tests a mobile terminal by simulating a base station will be described. First, the configuration of the base station simulator in the first embodiment will be described.

Figure 1:
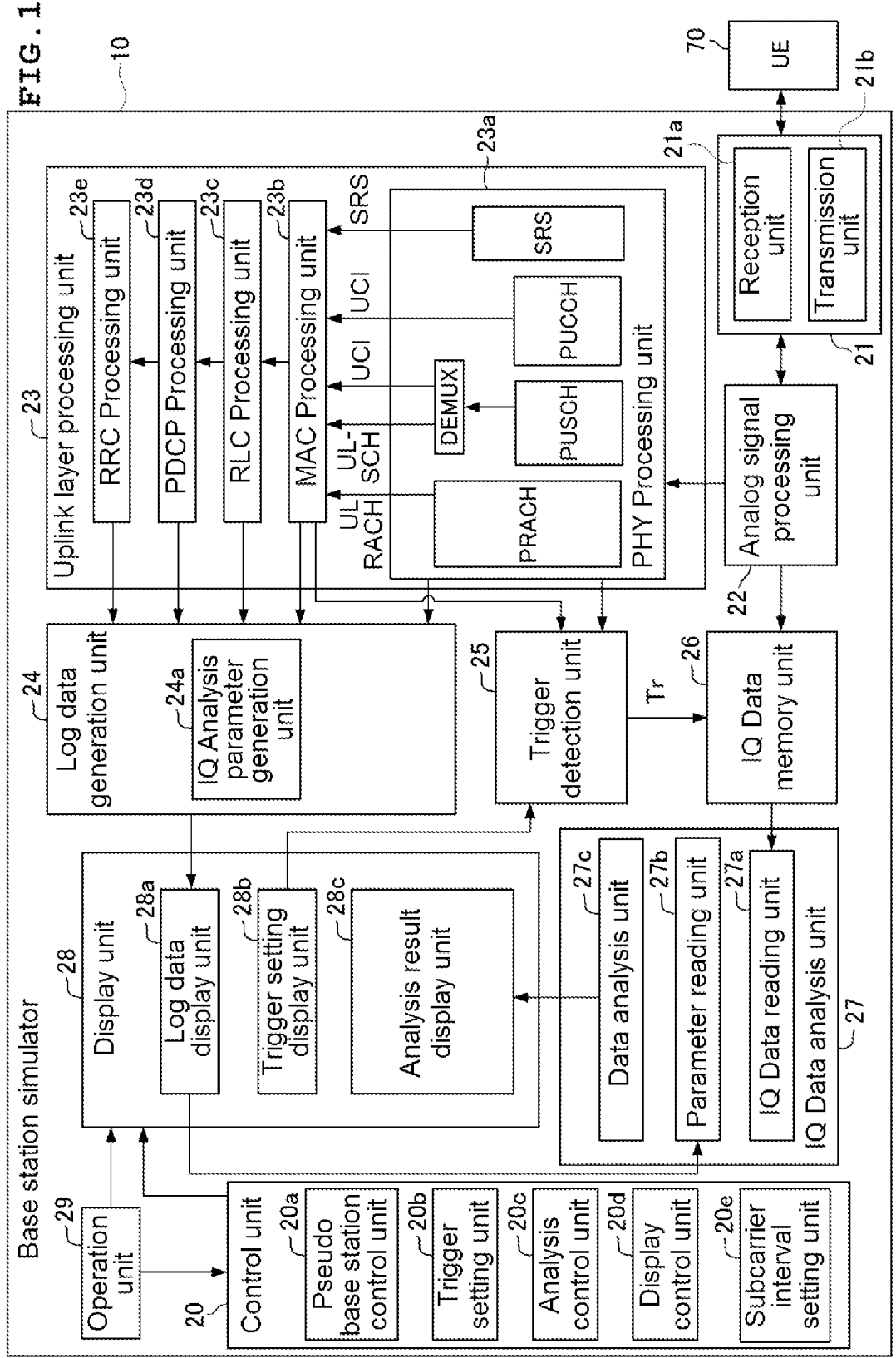
FIG. 1 is a block configuration diagram of a base station simulator according to a first embodiment of the present invention.

As shown in FIG. 1, a base station simulator 10 in the present embodiment tests the communication function of a mobile terminal (User Equipment (UE)) 70 by transmitting and receiving radio frequency signals to and from the UE 70. The UE 70 is a terminal such as a mobile phone or a mobile terminal that transmits and receives a radio frequency signal corresponding to a predetermined communication standard, for example, a communication standard called 5G NR.

The base station simulator 10 includes a control unit 20, a transmission/reception unit 21, an analog signal processing unit (signal data calculation unit) 22, an uplink layer processing unit 23, a log data generation unit 24, a trigger detection unit 25, an IQ data memory unit 26, an IQ data analysis unit 27, a display unit 28, and an operation unit 29. The base station simulator 10 includes a microcomputer (not shown) including a CPU, a ROM, a RAM, an FPGA, an input/output circuit to which various interfaces are connected, and the like. That is, the base station simulator 10 causes the microcomputer to function as a base station simulator for testing the UE 70 by executing a control program stored in advance in the ROM. The base station simulator 10 constitutes the signal analysis device according to the present invention.

The control unit 20 is a function unit that controls the entire base station simulator 10, and includes a pseudo base station control unit 20a, a trigger setting unit 20b, an analysis control unit 20c, a display control unit 20d, and a subcarrier interval setting unit 20e. The pseudo base station control unit 20a is a control means for managing a plurality of pseudo base stations, transmitting a radio frequency signal simulating each pseudo base station to the UE 70 according to a preset test scenario, receiving a radio frequency signal (signal to be measured) transmitted from the UE 70 that has received the radio frequency signal, and analyzing signal data included in the signal to be measured by the IQ data analysis unit 27 to execute a test for evaluating the communication function of the UE 70. In this test, the UE 70 transmits, for example, a signal to be measured modulated by the Orthogonal Frequency Division Multiple Access (OFDM) method, and the base station simulator 10 receives the signal to be measured by the reception unit 21a, and performs the analysis process by the IQ data analysis unit 27.

The trigger setting unit 20b performs control to set a condition for instructing the acquisition (storage) timing of the signal data to be analyzed among the signal data (IQ data) calculated from the received signal to be measured. When the communication state satisfying this condition is entered, the trigger signal is output from the trigger detection unit 25 described later. The above conditions set by the trigger setting unit 20b are hereinafter referred to as trigger conditions.

The analysis control unit 20c executes analysis control for causing the IQ data analysis unit 27 to analyze the IQ data (calculated by the analog signal processing unit 22) stored in the IQ data memory unit 26 by receiving the trigger signal. The display control unit 20d performs display control for displaying various types of information such as IQ data analysis results, on the display unit 28.

Figure 7:
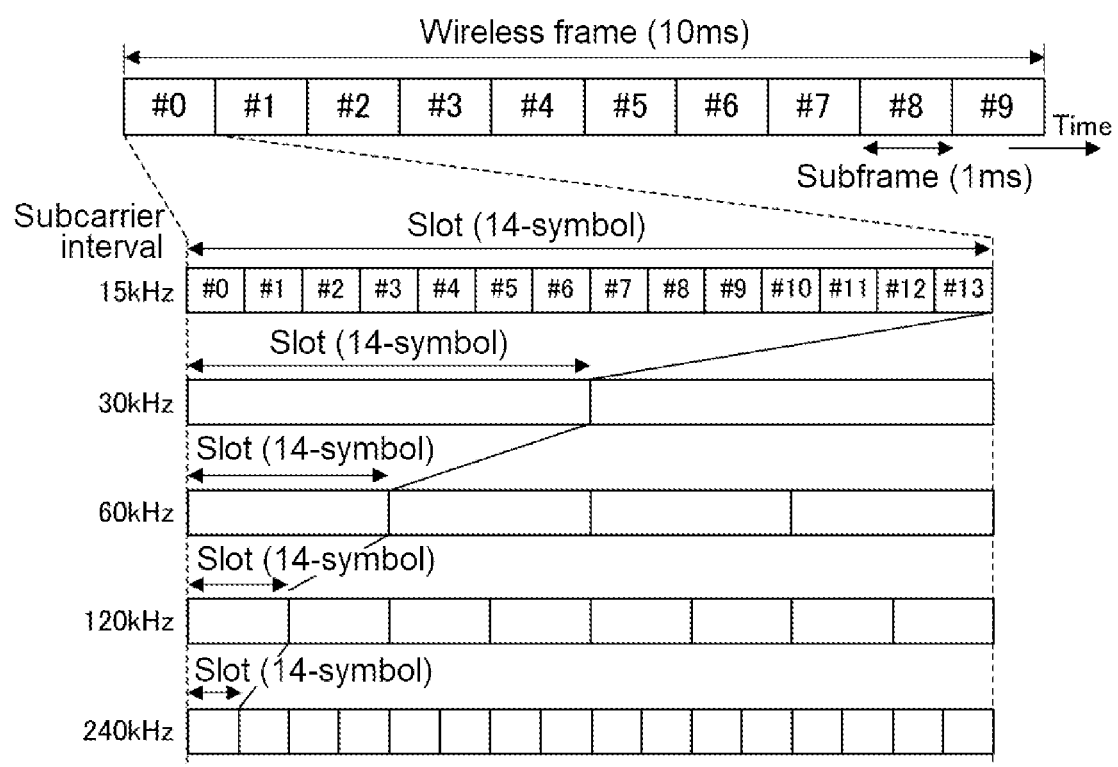
FIG. 7 is a diagram showing a frame configuration of the signal to be measured to be analyzed by the base station simulator according to the first embodiment of the present invention.

The subcarrier interval setting unit 20e is a function unit that controls the setting of the subcarrier interval in the frame configuration of a communication standard to which the signal to be measured belongs, for example, 5G NR (see FIG. 7). The subcarrier interval setting unit 20e can set the subcarrier interval at intervals of, for example, 15 kHz, 30 kHz, 60 kHz, 120 kHz, 240 kHz, or the like.

The reception unit 21a is a function unit that is provided corresponding to the uplink path in which the UE 70 transmits a signal (signal to be measured) to the base station simulator 10, and receives the radio frequency signal which is the signal (uplink data).

A transmission unit 21b is provided corresponding to a downlink path in which the UE 70 receives a signal from the base station simulator 10. The transmission unit 21b transmits the baseband data (hereinafter, simply referred to as "IQ data") of an I-phase component (in-phase component) and a Q-phase component (orthogonal component) which are downlink data generated by a base station simulation calculation unit (not shown) described later under the control of the pseudo base station control unit 20a of the control unit 20 to the UE 70. When receiving the baseband data transmitted from the transmission unit 21b, the UE 70 transmits the baseband data as a response signal to the reception to the base station simulator 10 as the above-described signal to be measured.

The transmission/reception unit 21 is composed of the transmission unit 21b and the reception unit 21a. The transmission/reception unit 21 communicates with the UE 70 via a Radio Frequency (RF) signal.

The analog signal processing unit 22 is an arithmetic processing function unit that receives an RF signal including uplink data from the UE 70, received by the reception unit 21a, as a signal to be measured, and calculates IQ data obtained by converting the signal to be measured from an analog signal to a digital signal. The analog signal processing unit 22 and the uplink layer processing unit 23 to be described later constitute the signal data calculation unit of the present invention.

The uplink layer processing unit 23 is a part that performs signal processing of each layer of signal data calculated by the analog signal processing unit 22. The uplink layer processing unit 23 includes a PHI processing unit 23a that processes a Physical Layer (PHI layer), a MAC processing unit 23b that processes a Medium Access Control Layer (MAC layer) above the PHI layer, an RLC processing unit 23c that processes a Radio Link Control Layer (RLC layer) above the MAC layer, a PDCP processing unit 23d that processes a Packet Data Convergence Protocol Layer (PDCP layer) above the RLC layer, and an RRC processing unit 23e that processes a Radio Resource Control Layer (RRC layer) above the PDCP layer.

In the uplink layer processing unit 23, the PHY processing unit 23a performs signal processing in the PHY layer on the signal data input from the analog signal processing unit 22, and inputs the signal data to the MAC processing unit 23b. Examples of physical layer level channels, control information, and reception status information related to signal processing in the PHY layer are shown below.

First, channels include UpLink-Random Access CHannel (UL-RACH), UpLink Shared CHannel (uplink data channel (UL-SCH)), Physical Random Access CHannel (physical channel for random access (PRACH)), Physical Uplink Shared CHannel (PUSCH), Physical Uplink Control CHannel (PUCCH) and the like.

As the control information, Uplink Control Information (UCI), Scheduling Request (SR), Channel State Information (CSI), Hybrid Automatic Repeat reQuest ACKnowledgement (request response signal (HARQ-ACK)), Sounding Reference Signal (SRS) and the like are used. Further, UCI (SR), which is a UCI in which SR is inserted, UCI (CSI), which is a UCI in which CSI is inserted, and UCI (HARQ-ACK), which is a UCI in which HARQ-ACK is inserted, are also used.

In addition, reception status information includes Discontinuous Transmission (signal non-input state information (DTX)), Cyclic Redundancy Check (redundancy check code for error detection (CRC)) failure information (CRC NG), CRC success information (CRC OK), decoding failure information (Decode NG), decoding success information (Decode OK) and the like.

A configuration is disclosed in which the PHY processing unit 23a shown in FIG. 1 is capable of processing the above-described channel, control information, and reception status information. Further, a configuration is also disclosed in which the PHY processing unit 23a has a demultiplexer (DEMUX) and the uplink data from the PUSCH is separated into two parts, UL-SCH and UCI, and transmitted.

Since the PHY processing unit 23a has a configuration capable of processing the above-described channel, control information, and reception status information, the base station simulator 10 can perform tests according to various test scenarios such as the following test scenarios 1 to 3.

Test Scenario 1:

The pseudo base station transmits a test signal as downlink data to the UE 70, and the UE 70 responds, for example, with UCI (SR), UCI (CSI), and UCI (HARQ-ACK).

Test Scenario 2:

The pseudo base station transmits a test signal as downlink data to the UE 70, and grasps the reception status depending on a response from the UE 70, for example, DTX, CRC MG, CRC OK, Decode MG, or Decode OK.

Test Scenario 3:

Perform tests based on test scenarios 1 and 2 at each channel level.

The MAC processing unit 23*b* processes each processing signal of the PHY layer input from the PHY processing unit 23*a* as a signal of the MAC layer, and passes the processed signal to the RLC processing unit 23*c*. The RLC processing unit 23*c* processes each processing signal of the MAC layer input from the MAC processing unit 23*b* as a signal of the RLC layer, and passes the processed signal to the PDCP processing unit 23*d*. The PDCP processing unit 23*d* processes each processing signal of the PLC layer input from the RLC processing unit 23*c* as a signal of the PDCP layer, and passes the processed signal to the RRC processing unit 23*e*. The RRC processing unit 23*e* processes each processing signal of the PDCP layer input from the PDCP processing unit 23*d* as a signal of the PRC layer.

In the uplink layer processing unit 23, the signal of each layer processed by the PHY processing unit 23*a*, the MAC processing unit 23*b*, the RLC processing unit 23*c*, the PDCP processing unit 23*d*, and the RRC processing unit 23*e* is transmitted to the log data generation unit 24. Of these, the signal of each layer processed by the PHY processing unit 23*a* and the MAC processing unit 23*b* is also is transmitted to the trigger detection unit 25.

As described above, the uplink layer processing unit 23 performs a communication protocol process of each layer in accordance with a predetermined communication standard, processes the signal data from the analog signal processing unit 22 to output the signal data to the log data generation unit 24, and outputs the signal data of the PHY layer and the MAC layer to the trigger detection unit 25.

The log data generation unit 24 generates log data from the signal data output from the uplink layer processing unit 23. The log data generated by the log data generation unit 24 includes time information and identifier information. The log data generated by the log data generation unit 24 is stored in a log data storage unit (not shown) composed of a large-capacity storage medium such as a hard disk drive (HDD) or a flash memory, for example.

The log data generation unit 24 has an IQ analysis parameter generation unit 24*a*. The IQ analysis parameter generation unit 24*a* generates IQ analysis parameters based on the signal data generated as described above, and transmits the generated IQ analysis parameters to a log data display unit 28*a* described later.

The trigger detection unit 25 has a function of monitoring the communication state involved in the above-described channels, control information and reception status information of the PHY layer and the MAC layer, based on the signal data of the PHY layer and the MAC layer input from the PHY processing unit 23*a* and the MAC processing unit 23*b* of the uplink layer processing unit 23, and determining (detecting) whether or not a communication state satisfies a preset trigger condition. The trigger condition is composed of, for example, a channel, a signal (for example, limited to the PHY layer and the MAC layer) type, and a reception status to be analyzed. The trigger condition can be set for each cell of a plurality of pseudo base stations (cells) under the control of the pseudo base station control unit 20*a* provided in the control unit 20, for example. The trigger condition is set, under the control of the trigger setting unit 20*b* constituting the control unit 20, by using the setting screen displayed on a trigger setting display unit 28*b* of the display unit 28 described later.

Among the information constituting the trigger condition, the cell to be analyzed can be selectively designated from the plurality of pseudo base stations (cells) under the control of the pseudo base station control unit 20*a*. As the signal or channel to be analyzed, any one of ULSCH, UCI (SR), UCI (CSI), UCI (HARQ-ACK), PRACH or SRS can be selectively designated from the channels or control information described in the explanation of the configuration of the PHY processing unit 23*a*. Further, the reception status can also be selectively designated from the above-described DTX, CRC NG, CRC OK, Decode NG, or Decode OK. The trigger condition may further include the total received power (total Power) of the signal to be analyzed.

The trigger detection unit 25 has a function of transmitting a trigger signal instructing to store the signal data under the communication state in the IQ data memory unit 26, when detecting that a communication state satisfying the trigger condition has occurred. The trigger detection unit 25 constitutes the trigger signal output unit of the present invention.

The IQ data memory unit 26 stores signal data calculated by the analog signal processing unit 22, and is composed of, for example, a ring buffer memory. When the trigger signal is input from the trigger detection unit 25, the IQ data memory unit 26 stores the signal data (IQ data) calculated by the analog signal processing unit 22 in the ring buffer memory.

Figure 5A:
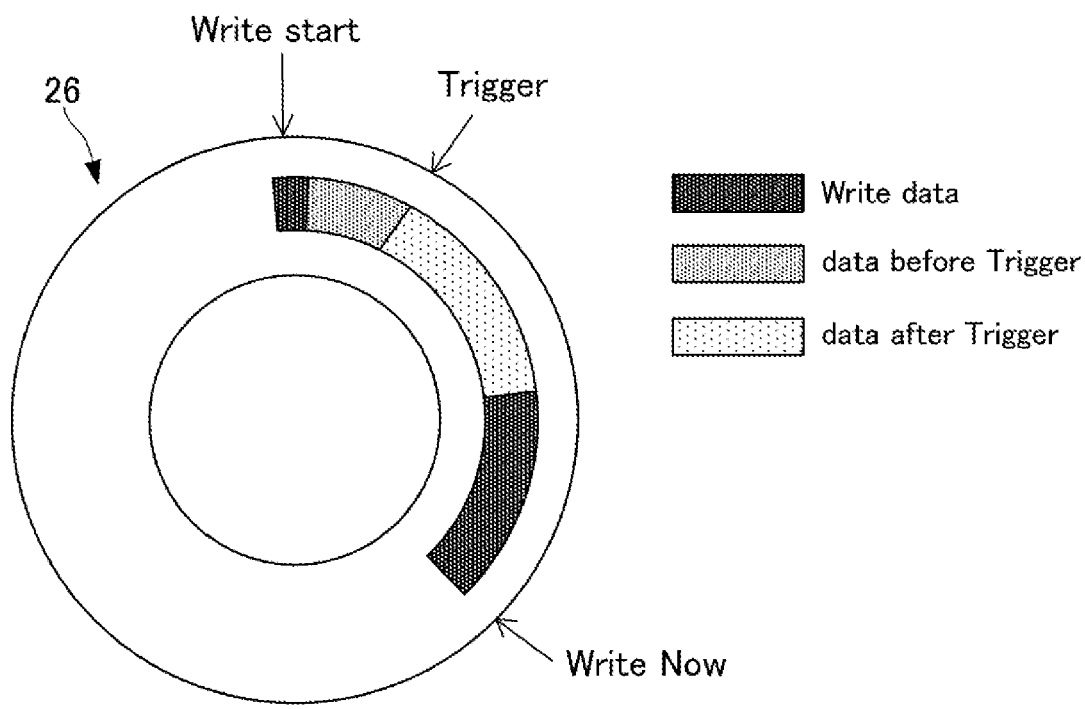
FIGS. 5A and 5B are conceptual diagrams for explaining an acquisition image of IQ data using a ring buffer memory of the base station simulator according to the first embodiment of the present invention.

Since the IQ data memory unit 26 is composed of a ring buffer memory, when the trigger is set, for example, as shown in FIG. 5A, writing of IQ data to the buffer memory is started before the trigger signal is generated (input), and when the trigger signal is generated (input), the writing of the IQ data is stopped within the range that does not overwrite the previous data in the designated range. With such a structure, the IQ data memory unit 26 can acquire IQ data before the trigger signal is generated.

Figure 5B:
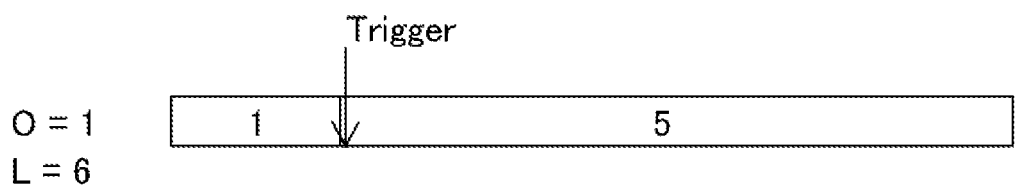

Here, the range of IQ data acquired from the timing when the trigger signal is generated is determined based on, for example, the time before the trigger signal (Trigger Offset O) and the data acquisition time (Data length L), as shown in FIG. 5B. FIG. 5B shows an example in which the ratio of Trigger Offset O to Data length L is 1:6, and IQ data corresponding to the data acquisition time (Data length L) and the addition time of 5 times the data acquisition time is acquired. As described above, the IQ data memory unit 26 has a function of receiving a trigger signal and extracting IQ data in a predetermined section according to a predetermined timing from the signal data, and constitutes the signal extraction unit of the present invention. Further, the IQ data memory unit 26 stores the signal data calculated by the analog signal processing unit 22 in the ring buffer memory, and constitutes the storage unit of the present invention.

The IQ data analysis unit 27 is a processing function unit that analyzes and processes IQ data stored in the IQ data memory unit 26 under the control of the analysis control unit 20*c*, and includes an IQ data reading unit 27*a*, a parameter reading unit 27*b*, and a data analysis unit 27*c*. The IQ data reading unit 27*a* performs a process of reading IQ data stored in the IQ data memory unit 26. The parameter reading unit 27*b* executes a process of reading the IQ analysis parameters generated by the IQ analysis parameter generation unit 24a of the log data generation unit 24 in accordance with the IQ data reading by the IQ data reading unit 27a. The data analysis unit 27c executes a process of analyzing the IQ data read from the IQ data memory unit 26 based on the IQ analysis parameters. In the present embodiment, the data analysis unit 27c has a power calculation function of calculating, based on signal data of the signal to be measured received by the reception unit 21a and calculated by the analog signal processing unit 22, power of the signal data for each frequency in each time. The IQ data analysis unit 27 and the IQ data memory unit 26 are preferably connected by a wired cable.

The display unit 28 includes a log data display unit 28a, a trigger setting display unit 28b, and an analysis result display unit 28c. The log data display unit 28a is a part that displays a display screen for displaying a log, and the trigger setting display unit 28b is a part that displays a setting screen 30 (see FIG. 2) for setting a trigger condition, and the analysis result display unit 28c is a part that displays analysis result screens 40 (see FIG. 6). In the present embodiment, the analysis result display unit 28c has a display function of displaying, based on the calculation result of the power of the signal data by the power calculation function described above of the data analysis unit 27c, the distribution of the power of the signal data on the time axis and the frequency axis. The analysis result display unit 28c and an analysis result screen 40 correspond to the display unit of the present invention.

In the control unit 20, the display control unit 20d generates a display screen for displaying the log, reads the log data from the log data storage unit according to the operation content of the operation unit 29, and displays the log based on the information included in the log data on the log data display unit 28a. The display control unit 20d also generates the setting screen 30 (see FIG. 2) for setting the trigger condition, reads the setting screen 30 according to the operation contents of the operation unit 29, and displays the setting screen 30 on the trigger setting display unit 28b. Further, the display control unit 20d generates the analysis result screen 40 (see FIG. 6) for displaying the analysis result of the IQ data by the IQ data analysis unit 27, reads the analysis result screen 40 according to the operation contents of the operation unit 29, and displays the analysis result screen 40 on the analysis result display unit 28c.

The operation unit 29 is composed of an input device such as a keyboard, dial or mouse, a display for displaying test conditions, control circuits and software for controlling these, and is operated by the examiner to input each test condition, and set display contents of the display unit 28.

The operation of the base station simulator 10 having the above-described configuration will be described below. As described above, in the base station simulator 10, in the test performed according to the test scenario under the control of the pseudo base station control unit 20a, the RF signal (signal to be measured) including the uplink data from the UE 70 is received by the reception unit 21a, and the signal data including the IQ data is calculated by the signal processing in the analog signal processing unit 22.

The signal data calculated by the analog signal processing unit 22 is input to the uplink layer processing unit 23 and subjected to signal processing of each layer, and the signal data after signal processing of the PRY layer and the MAC layer is input to the trigger detection unit 25. The signal data (IQ data) calculated by the analog signal processing unit 22 is also input to the IQ data memory unit 26.

In the base station simulator 10 having such an uplink signal processing function, in order to analyze the signal data input from the analog signal processing unit 22 to the IQ data memory unit 26, it is necessary to set the trigger condition for issuing the trigger signal that activates the acquisition operation of the IQ data to be analyzed in the IQ data memory unit 26.

Figure 3:
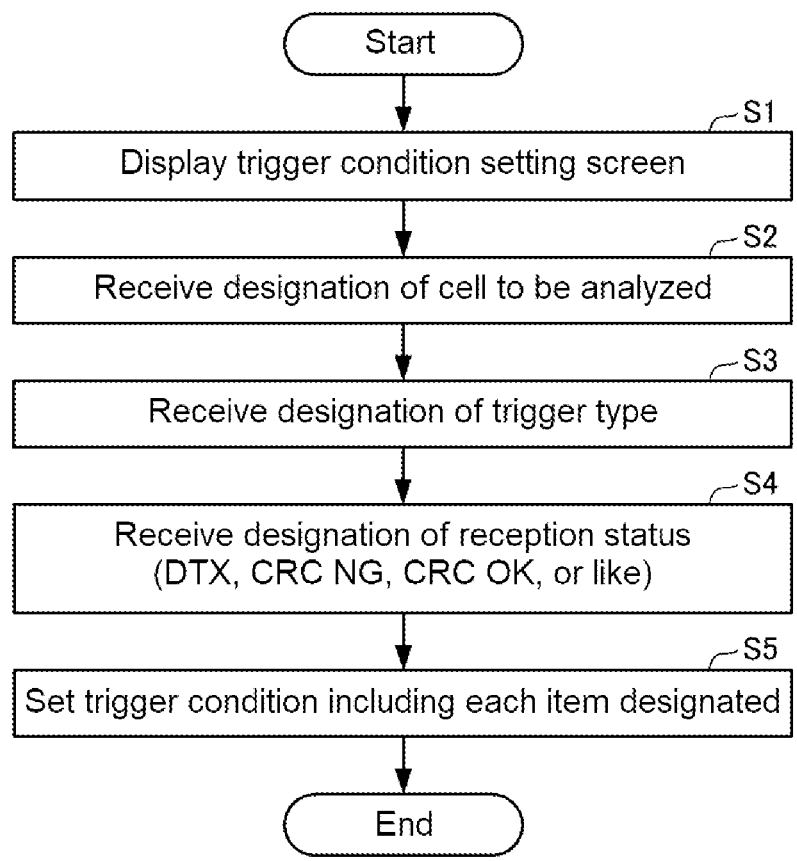
FIG. 3 is a flowchart showing a trigger condition setting processing operation in the base station simulator according to the first embodiment of the present invention.

The trigger condition setting processing operation in the base station simulator 10 will be described with reference to the flowchart shown in FIG. 3.

In order to set the trigger condition in the base station simulator 10, first, the operation unit 29 performs a predetermined trigger setting start operation. By this trigger setting start operation, the trigger setting unit 20b causes the trigger setting display unit 28b of the display unit 28 to display the trigger condition setting screen 30 (step S1).

Figure 2:
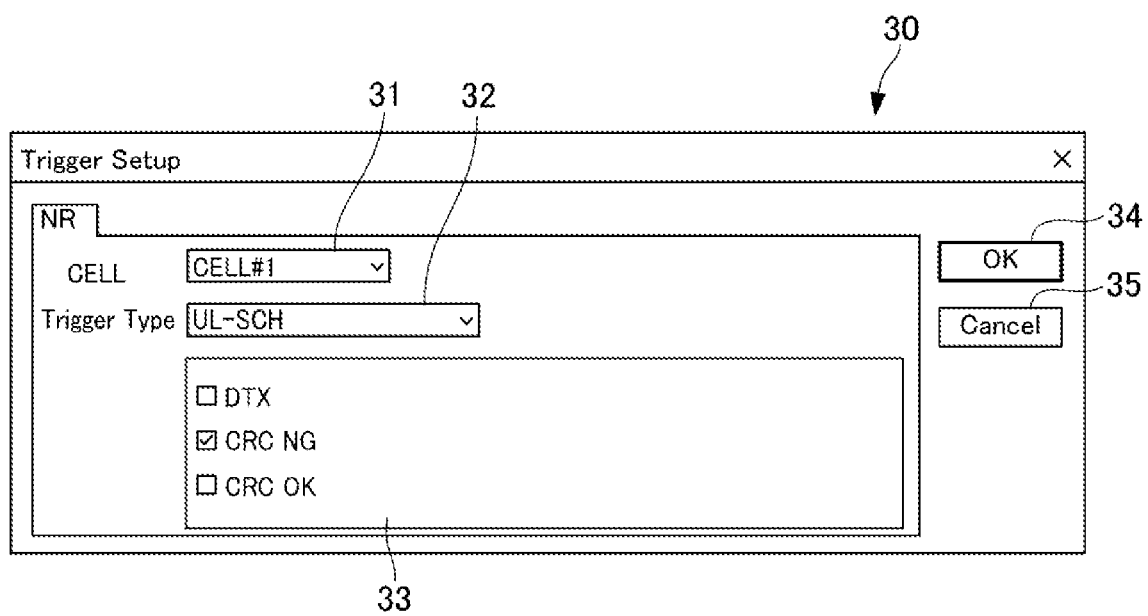
FIG. 2 is a diagram showing a configuration example of a trigger condition setting screen in the base station simulator according to the first embodiment of the present invention.

As shown in FIG. 2, the setting screen 30 includes, for example, a cell designation tool 31, a trigger type designation tool 32, a reception status designation tool 33, an OK button 34, and a cancel button 35. The cell designation tool 31 is for selectively designating a pseudo base station (cell) to be analyzed for IQ data. The trigger type designation tool 32 is for selectively designating the signal type (trigger type) to be analyzed. The reception status designation tool 33 is for selectively designating the communication state (reception status) of the signal to be analyzed. The OK button 34 is a tool for instructing the start of setting, and the cancel button 35 is a tool for instructing cancellation of the setting.

After the setting screen 30 is displayed in step S1, the trigger setting unit 20b receives the designation of the cell to be analyzed by the cell designation tool 31 on the setting screen 30 (step S2). The cell option is all pseudo base stations under the control of the pseudo base station control unit 20a.

Next, the trigger setting unit 20b receives the designation of the trigger type by the trigger type designation tool 32 on the setting screen 30 (step S3). The trigger type option is, for example, either ULSCH, UCI (SR), UCI (CSI), UCI (HARQ-ACK), PRACH or SRS.

Subsequently, the trigger setting unit 20b receives the designation of the reception status of the signal to be analyzed by the reception status designation tool 33 on the setting screen 30 (step S4). Examples of the communication state options include DTX, CRC NG, CRC OK, or Decode NG, Decode OK and the like.

Further, the trigger setting unit 20b monitors whether or not the OK button 34 on the setting screen 30 is pressed, and when the OK button 34 is pressed, the trigger setting unit 20b sets the trigger condition including each item designated in the above steps S2 to S4 (step S5), and completes a series of trigger condition setting processes.

FIG. 2 shows a display example of the setting screen 30 at the time of setting a trigger condition in which the cell to be analyzed is a cell having an identifier of "CELL #1", the trigger type is "UL-SCH", and the reception status is "CRC NG".

The trigger condition set as described above is passed from the trigger setting unit 20b to the trigger detection unit 25. The trigger detection unit 25 monitors whether or not the communication state satisfies the trigger condition acquired from the trigger setting unit 20b. When it is detected that the communication state satisfies the trigger condition, the trigger detection unit 25 outputs a trigger signal to the IQ data memory unit 26 at a predetermined timing.

According to the trigger condition set on the setting screen 30 shown in FIG. 2, the base station simulator 10 outputs the trigger signal when the signal data using the UL-SCH of the uplink data from the UE 70 is CRC NG, in the simulated communication between the cell having the identifier of "CELL #1" and the UE 70.

When receiving the trigger signal, the IQ data memory unit 26 acquires (stores) IQ data in a predetermined section (corresponding to the predetermined timing) as an analysis target from the signal data calculated by the analog signal processing unit 22. Then, the IQ data analysis unit 27 executes the analysis process on the IQ data stored in the IQ data memory unit 26.

Next, the IQ data analysis processing operation in the base station simulator 10 will be described with reference to the flowchart shown in FIG. 4. Here, it is assumed that the base station simulator 10 performs the test of the UE 70 according to the test scenario under the control of the pseudo base station control unit 20*a* and transmit and receive a radio frequency signal to and from the UE 70. It is premised that the IQ data analysis process in the base station simulator 10 is performed on the uplink data transmitted from the UE 70 to the base station simulator 10 in the test.

In performing the IQ data analysis process, the trigger detection unit 25 acquires and holds the trigger condition set by the trigger setting unit 20*b* (step S11).

After that, when the test of the UE 70 is started under the control of the pseudo base station control unit 20*a*, the radio frequency signal is transmitted and received to and from the UE 70, and the uplink data from the UE 70 is received by the reception unit 21*a* (step S12), and is input to the analog signal processing unit 22.

Next, the analog signal processing unit 22 receives the uplink data input from the reception unit 21*a* as a signal to be measured, converts the signal to be measured from an analog signal to a digital signal, and executes an arithmetic process for calculating signal data (IQ data) (step S13).

The signal data calculated by the arithmetic process in step S13 is transmitted to the uplink layer processing unit 23 and the IQ data memory unit 26 (step S14).

The uplink layer processing unit 23 sequentially performs the processes of the PHY layer, the MAC layer, the RLC layer, the PDCP layer, and the RRC layer on the signal data from the analog signal processing unit 22 (step S15). Then, the processed signal data is transmitted to the log data generation unit 24, and the signal data of the PHY layer and the MAC layer is transmitted to the trigger detection unit 25.

The trigger detection unit 25 collates the input signal data of the PHY layer and the MAC layer with the trigger condition that has already been acquired (see step S11), and determines whether or not the communication state of the signal data satisfies the trigger condition (step S16). In a case where it is determined that the communication state of the signal data does not satisfy the trigger condition (NO in step 16), the processes of step S12 and subsequent steps are continued.

On the other hand, in a case where it is determined that the communication state of the signal data satisfies the trigger condition (YES in step 16), the trigger detection unit 25 outputs the trigger signal to the IQ data memory unit 26 at a predetermined timing (step S17).

The IQ data memory unit 26 is composed of a ring buffer memory having a predetermined storage capacity, and always stores (secures) the latest signal data of the above storage capacity among the signal data input from the analog signal processing unit 22. When receiving the trigger signal output by the trigger detection unit 25, the IQ data memory unit 26 extracts IQ data in a predetermined section corresponding to the predetermined timing described above from the secured signal data (step S18).

Next, in the IQ data analysis unit 27, the IQ data reading unit 27*a* reads IQ data in a predetermined section from the IQ data memory unit 26, and the data analysis unit 27*c* executes an analysis process of the read IQ data (step S19). Here, the data analysis unit 27*c* analyzes the read IQ data, based on the IQ analysis parameters read from the log data by the parameter reading unit 27*b*.

After the IQ data analysis process in step S19 is completed, the display control unit 20*d* executes the analysis result display process for displaying the analysis result of the IQ data on the display unit 28 (step S20). Specifically, in this signal analysis device 1, in step S19 above, the data analysis unit 27*c* calculates the power of the signal data of the signal to be measured in association with, for example, the OFDM symbol and the frequency (resource block (RB)) in the frame configuration (see FIG. 7) to be described later, and in step S20, the display control unit 20*d* controls the power distribution of these signal data so as to be associated with the time axis and the frequency axis and displayed on the analysis result display unit 28*c* of the display unit 28 (see FIG. 6).

While displaying the IQ data analysis result in step S20, when a predetermined display end operation is performed, the display control unit 20*d* performs control to end the display process of the analysis result screen 40 and the pseudo base station control unit 20*a* performs control to end the above a series of IQ data analysis process.

Figure 4:
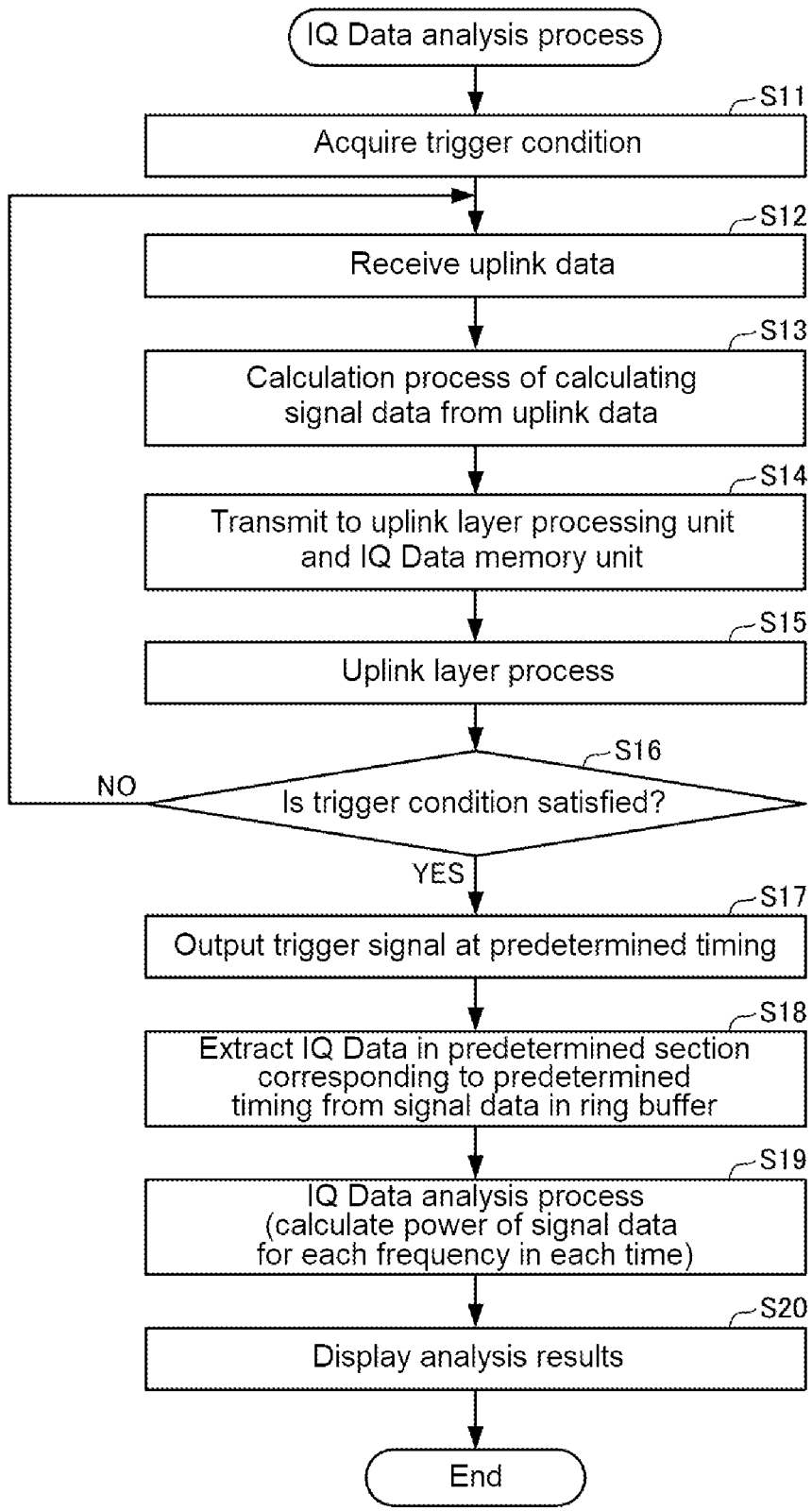
FIG. 4 is a flowchart showing an IQ data analysis processing operation in the base station simulator according to the first embodiment of the present invention.

According to the base station simulator 10 that sets the trigger condition by using the setting screen 30 shown in FIG. 2 and executes the IQ data analysis process according to the flowchart shown in FIG. 4, regarding the signal processing of the PHY layer of the uplink data from the UE 70, it becomes possible to analyze IQ data according to the above-described test scenarios 1 to 3 and the like.

The present embodiment illustrates an example in which the signal data (the signal stored corresponding to the output of the trigger signal) extracted by the IQ data memory unit 26 is the signal data of the physical layer (PHY layer) and the trigger condition set by the trigger setting unit 20*b* is contents including the trigger type and the reception status, but the present invention is not limited to this. For example, the trigger condition may be the information form including the information managed in accordance with each pseudo base station under the control of the pseudo base station control unit 20*a*, for example, the act time (the period for activating the communication operation of the pseudo base station).

The processing operations of steps S19 and S20 in FIG. 4 will be described in more detail. First, the IQ data analysis process in step S19 will be described in more detail with an example. In step S19, the IQ data analysis unit 27 of the base station simulator 10 executes a process of reading the signal data of the signal to be measured, that is calculated by the analog signal processing unit 22 (see step S13 in FIG. 4) and is stored in the IQ data memory unit 26 by using the trigger signal, by the IQ data reading unit 27*a*, and analyzing the read signal data by the data analysis unit 27*c*.

At that time, in the IQ data analysis unit 27, the parameter reading unit 27*b* reads out the parameter to be analyzed, while the data analysis unit 27*c* performs a power calculation process of calculating the power of the signal data corresponding to the parameter, among the signal data read by the IQ data reading unit 27*a*, for example, for each frequency in each time.

Examples of the signal data (parameters) to be the target of the power calculation process include signal data of uplink physical data channel (PUSCH) and uplink physical control channel (PUCCH) that is transmitted by the pseudo base station (pseudo base station control unit 20a) and the base station simulator 10 is waiting in the same slot. The signal data items such as PUSCH and PUCCH are scheduled by the scheduling function of the pseudo base station, and are transmitted by the pseudo base station according to the schedule. A plurality of types of PUCCH are assumed, and here, for example, PUCCH0, PUCCH1 and PUCCH2 are assumed to be prepared. In addition to these, in the power calculation process, signal data that is not included in the schedule on the pseudo base station side (assigned outside the reception standby range) (hereinafter, referred to as other signal data ("Other")) may be the target. When the pseudo base station erroneously transmits signal data that is not on the schedule, the power of the signal data is measured under the analysis item name "Other".

After the power calculation process by the data analysis unit 27c in step S19 of FIG. 4 is completed, t display control unit 20d performs display control (see step S20 in FIG. 4) for displaying the distribution of the power of the signal data on the time axis and the frequency axis, on the analysis result display unit 28c, based on the processing result of the power calculation process, that is, the analysis result of the signal data.

Figure 6:
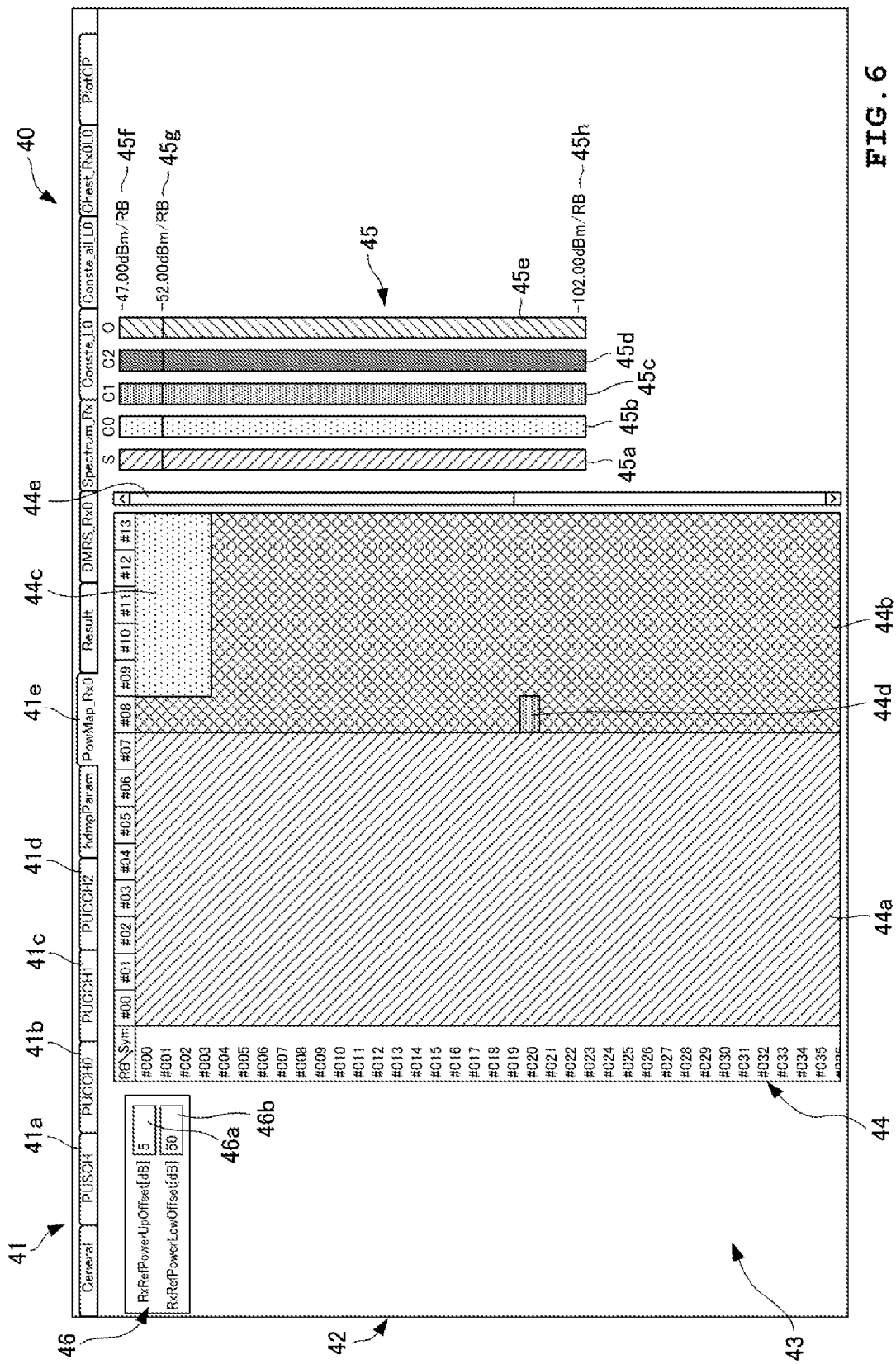
FIG. 6 is a diagram showing a configuration example of an analysis result screen of the IQ data in the base station simulator according to the first embodiment of the present invention.

For the display of the power distribution, for example, the analysis result screen 40 having the display form shown in FIG. 6 is used. The analysis result screen 40 has a functional configuration for displaying the distribution of the power of various analyzed signal data (parameters) on the time axis and the frequency axis. The configuration will be described below.

As shown in FIG. 6, the analysis result screen 40 has an analysis item selection tab 41 and an analysis result display area 42. A plurality of analysis item selection tabs 41 are provided corresponding to the plurality of analysis items, respectively, and are pressed to select desired analysis items. In this example, the analysis item selection tab 41 has a plurality of tabs such as a PUSCH tab 41a, a PUCCH0 tab 41b, a PUCCH1 tab 41c, a PUCCH2 tab 41d, and a power Map tab 41e for respectively selecting PUSCH, PUCCH0, PUCCH1, PUCCH2, and power Map, as analysis items. Among the tabs, the power Map tab 41e is used to display the power (analysis result) distribution for each data signal calculated by the data analysis unit 27c.

The analysis result display area 42 is an area for displaying the analysis result of the analysis item corresponding to the tab selectively pressed in the analysis item selection tab 41. The analysis result screen 40 shown in FIG. 6 discloses a display example of a power Map screen 43 in the analysis result display area 42 when the power Map tab 41e is pressed.

As shown in FIG. 6, the power Map screen 43 has a power Map display area 44, a color classification display area 45, and a shading adjustment tool 46. The power Map display area 44 is an area for displaying the distribution of the power of various analyzed signal data (parameters) on the time axis and the frequency axis. On the analysis result screen 40 shown in FIG. 6, in the power Map display area 44, the horizontal axis is the time axis and the vertical axis is the frequency axis. Specifically, in this example, a Map structure is adopted in which the time axis has, as a unit, a symbol forming a predetermined slot in the OFDM type wireless frame configuration, and the frequency axis has, as a unit, a resource block in the wireless frame configuration.

FIG. 7 shows, for example, a frame configuration of signal data in the 5G NR standard, which is the analysis target of the base station simulator 10 according to the present embodiment. As shown in FIG. 7, in 5G NR, slots, subframes, and frames are configured with a plurality of OFDM symbols. A slot is composed of 14 OFDM symbols regardless of the subcarrier interval, a subframe is defined as a section of 1 ms, and a frame is defined by 10 subframes.

The power Map display area 44 on the power Map screen 43 of the analysis result screen 40 shown in FIG. 6 is assigned with 14 OFDM symbols ("Sym") in the time axis direction. In addition, in the frequency direction, it is assigned with resource blocks ("RB") by a plurality of consecutive subcarriers regardless of the subcarrier interval. The number of RBs is determined according to the system band preset in the pseudo base station, and for example, 273 at maximum can be set.

Further, on the power Map screen 43 of the analysis result screen 40 shown in FIG. 6, the color classification display area 45 is an area for displaying the color classification for each parameter mapped on the power Map of the power Map display area 44 described above. In this example, five vertically long color bands 45a, 45b, 45c, 45d, and 45e corresponding to the five types of parameters of reference characters S, C0, C1, C2, and O are displayed. Here, the reference characters S, C0, C1, and C2 correspond to the parameters of PUSCH, PUCCH0, PUCCH1, and PUCCH2 that can be selected by the PUSCH tab 41a, the PUCCH0 tab 41b, the PUCCH1 tab 41c, and the PUCCH2 tab 41d, respectively. In addition, the reference character O corresponds to other signal data ("Other") that is not included in the schedule on the pseudo base station side.

The color bands 45a, 45b, 45c, 45d, and 45e corresponding to the reference characters S, C0, C1, C2, and O are displayed in different colors of first color, second color, third color, fourth color, and fifth color. Further, these color bands 45a, 45b, 45c, 45d, and 45e are shaded and displayed for each color such that, for example, the color becomes lighter as it goes upward and becomes darker as it goes downward. The color shade in each of the color bands 45a, 45b, 45c, 45d, and 45e reflects the power value for each parameter (PUSCH, PUCCH0, PUCCH1, PUCCH2, and Other) to which each color is assigned. Specifically, the color bands 45a, 45b, 45c, 45d, and 45e have a structure capable of displaying that the power values of the parameters (PUSCH, PUCCH0, PUCCH1, PUCCH2, and Other) identified respectively by the reference characters S, C0, C1, C2, and O decrease as color changes from a light color to a dark color (downward), for example.

In the color bands 45a, 45b, 45c, 45d, and 45e, the power indicator bars 45f, 45g, and 45h indicating the power values of the parameters (PUSCH, PUCCH0, PUCCH1, PUCCH2, Other) identified by the reference characters S, C0, C1, C2, and O are also displayed at three positions of the top, the bottom, and the position of an appropriate height between the top and the bottom, respectively. The power indicator bars 45f and 45g indicate the maximum value and the minimum value of the power of the parameters (PUSCH, PUCCH0, PUCCH1, PUCCH2, Other) identified by the reference characters S, C0, C1, C2, and O, respectively. The power indicator bar 45h indicates a reference value of the power of the parameters (PUSCH, PUCCH0, PUCCH1, PUCCH2, Other). In the example of FIG. 6, the reference value of the power of the parameters (PUSCH, PUCCH0, PUCCH1, PUCCH2, Other) is −52.00 (dBm/RB), the maximum value is −47.00 (dBm/RB) larger than the reference value by 5 (dBm/RB), and the minimum value is −102.00 (dBm/RB) smaller than the reference value by 50 (dBm/RB).

On the power Map screen 43 of the analysis result screen 40 shown in FIG. 6, the shading adjustment tool 46 adjusts the shade of each color by setting the minimum and maximum values of the power of the parameters (PUSCH, PUCCH0, PUCCH1, PUCCH2, Other) identified by the reference characters S, C0, C1, C2, and O. In this example, an example is disclosed in which the maximum value setting tool 46*a* and the minimum value setting tool 46*b* are used to designate a shade area larger than "5" dBm/RB and small r than "50" dBm/RB starting from the above-described reference value.

Next, the operation of the analysis result display process (corresponding to the process of step S20 in FIG. 4) using the analysis result screen 40 having the above configuration will be described in more detail with reference to the flowchart shown in FIG. 8.

It is assumed that in the display process, the signal to be analyzed by the base station simulator 10 (the signal to be measured transmitted from the UE 70 and the pseudo base station) is, for example, a 5G NR standard signal, and is a signal obtained by coding using a Low Density Parity Check (LDPC) code. This signal has, for example, the frame configuration shown in FIG. 7, in which OFDM symbols (hereinafter, symbols) repeatedly appear at intervals of 14 symbols in the time axis direction, and a plurality of resource blocks (RBs) are present for each symbol in the frequency direction.

Prior to this display process, the data analysis unit 27*c* of the base station simulator 10 executes a process (analysis process) for calculating the power of the signal to be measured having the above-described frame configuration for each frequency (RB) in each time (symbol), for example, in step S19 of FIG. 4. As described above, the signal data to be analyzed is the signal data stored in the IQ data memory unit 26 in response to the trigger signal generated by the trigger detection unit 25, that is, the signal data satisfying the preset trigger condition, and the signal types (analysis items) include parameters such as PUSCH, PUCCH0, PUCCH1, PUCCH2, and "Other". The values calculated by the above analysis process in the data analysis unit 27*c*, that is, the analysis result data of each analysis item are stored in, for example, the storage medium (memory) of the above-described microcomputer.

After the analysis process in step S19 is completed, in step S20, the display control unit 20*d* performs display control for displaying the analysis result screen 40 (basic screen) including the above-described plurality of analysis items on the analysis result display unit 28*c*, and updating and displaying the analysis result screen 40 of the display form including the analysis result of the selected analysis item while receiving the selection of the desired analysis item. The display control at this time is performed according to the flowchart shown in FIG. 8.

Figure 8:
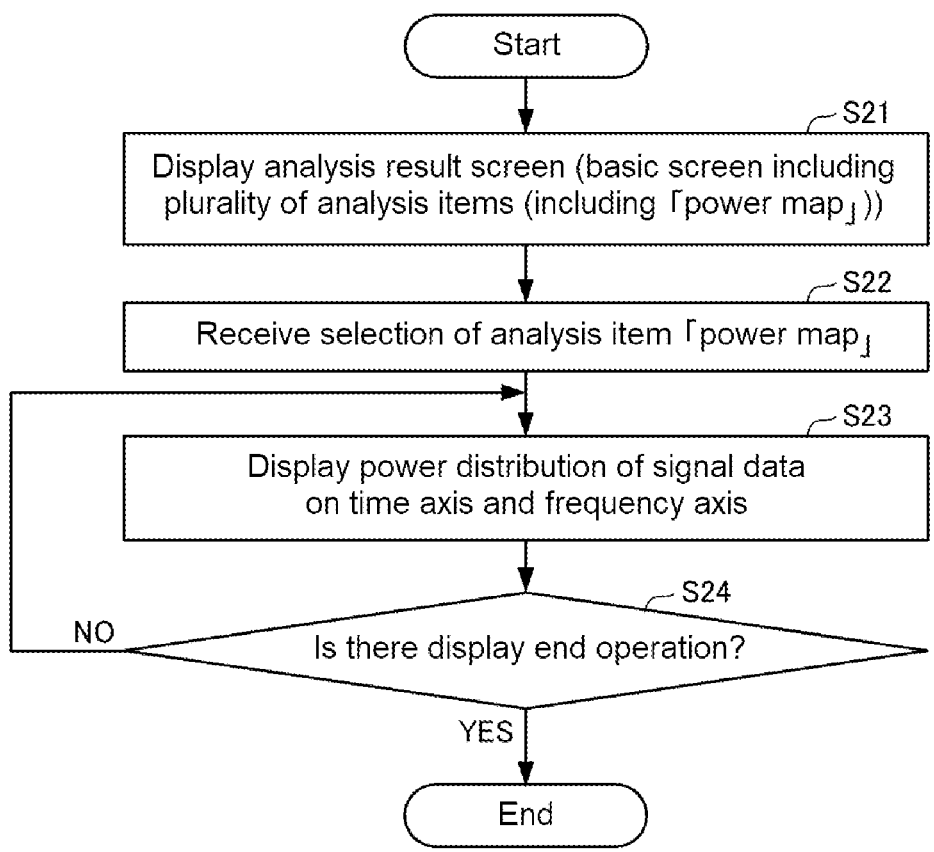
FIG. 8 is a flowchart showing an IQ data analysis result display processing operation in the base station simulator according to the first embodiment of the present invention.

When the analysis result display control shown in FIG. 8 is started, the display control unit 20*d* first reads basic screen data (image data) including a plurality of analysis items calculated in step S19 of FIG. 4 from, for example, a memory, and performs control to display the analysis result screen 40 as the basic screen based on the basic screen data (step S21). The basic screen has, for example, a screen configuration in which the analysis item selection tab 41 is displayed on the analysis result screen 40 shown in FIG. 6 and the analysis result related to a specific analysis item is not displayed in the analysis result display area 42.

While displaying the analysis result screen (basic screen) 40 in step S21, the display control unit 20*d* receives an operation of selecting a desired analysis item by the operator. Here, the operator uses each tab configuring the analysis item selection tab 41 on the analysis result screen 40, for example, the PUSCH tab 41*a*, the PUCCH0 tab 41*b*, the PUCCH1 tab 41*c*, the PUCCH2 tab 41*d*, and the power Map tab 41*e* to perform a tab display selection operation of a desired analysis item among PUSCH, PUCCH0, PUCCH1, PUCCH2, and power Map, respectively, and the display control unit 20*d* receives the selection operation of each of these tabs.

Here, for example, when the selection operation of "power Map" by the power Map tab 41*e* being pressed is received (step S22), the display control unit 20*d* reads analysis result data of all the parameters related to the generation of "power Map" among PUSCH, PUCCH0, PUCCH1, PUCCH2, and Other from the memory, and performs control so as to display the analysis result of each parameter based on the analysis result data.

Specifically, the display control unit 20*d* reads the power values (measured values) of signal data of PUSCH, PUCCH0, PUCCH1, PUCCH2, and "Other" from the memory, and performs control so as to display the power distribution of each signal on the time axis and the frequency axis for each signal, in the power Map display area 44 in the analysis result display area 42 on the analysis result screen 40 in the form shown in FIG. 6 (step S23).

As shown in FIG. 6, in the display form of power distribution for the power Map display area 44, the horizontal axis is the time axis, and is composed of 14 consecutive symbols identified respectively by the reference numbers #00 to #13. On the other hand, the vertical axis is the frequency axis, and is composed of a plurality of consecutive RBs identified by the reference numbers #000, #001, #002, . . . . As described above, the power Map display area 44 has a MAP area having a horizontal axis as a time axis and a vertical axis as a frequency axis. In step S23, the display control unit 20*d* performs display control such that the power values of the above-described signal data in each RB for each symbol are expanded in the different colors and the shades of the colors associated with the respective data items in advance on the Map on the time axis and the frequency axis in the power Map display area 44 and displayed for each signal (as a power distribution).

In accordance with the display control of the power distribution for the power Map display area 44, the display control unit 20*d* displays the color bands 45*a*, 45*b*, 45*c*, 45*d*, and 45*e* in different colors in the color classification display area 45 on the analysis result screen 40. These color bands 45*a*, 45*b*, 45*c*, 45*d*, and 45*e* correspond to PUSCH, PUCCH0, PUCCH1, PUCCH2, and "Other", respectively, and each color is displayed, for example, in a form in which the color becomes lighter (higher power) toward the top, and becomes darker (lower power) toward the bottom.

Further, the display control unit 20*d* displays the shading adjustment tool 46 outside each area of the power Nap display area 44 and the color classification display area 45 on the analysis result screen 40. On the analysis result screen 40, the shading adjustment tool 46 is displayed in the shading adjustment state in which it is larger than the reference value by "5" dBm/RB and smaller by "50" dBm/RB, by using a maximum value setting tool 46*a* and a minimum value setting tool 46*b*.

During execution of the display control of the power distribution of PUSCH, PUCCH0, PUCCH1, PUCCH2, and "Other" in the NAP area in step S23, the display control unit 20*d* monitors whether or not a display end operation is performed by the operation unit 29, for example (step S24). When it is determined that the display end operation has not been performed (NO in step S24), the display control unit 20d continues the power distribution display control in step S23. On the other hand, when it is determined that the display end operation has been performed (YES in step S24), the above-described series of display control is ended.

Next, a specific display form of the analysis result screen 40 when "power Map" is selected in step S23 will be described in more detail with reference to FIG. 6. In the analysis result screen 40 shown in FIG. 6, in the power Map display area 44, with respect to symbols of #00 to #07 in the time axis direction, a plurality of consecutive RBs (all RBs that can be displayed in the scroll state) in the frequency direction are displayed in the first color corresponding to PUSCH (corresponding to reference character S). With respect to a plurality of consecutive RBs in the frequency direction, it is possible to see even higher frequency RBs by scrolling the display area by using the scroll bar 44e. The density of the first color displayed here corresponds to, for example, any density among the densities of the first color which becomes darker in order from the maximum power value to the minimum power value, in the color band 45a corresponding to the reference character S.

Further, for each of the symbols of #09 to #13, the continuous RBs of #000 to #003 are displayed in the second color corresponding to PUCCH0 (corresponding to the reference character C0). The density of the second color displayed here corresponds to, for example, any density among the densities of the second color which becomes darker in order from, the maximum, power value to the minimum power value, in the color band 45b corresponding to the reference character C0.

For the symbol #08, only the RB of #020 is displayed in the third color corresponding to PUCCH1 (corresponding to the reference character C1). The density of the third color displayed here corresponds to, for example, any density among the densities of the third color which becomes darker in order from the maximum power value to the minimum power value, in the color band 45c corresponding to the reference character C1.

Further, regarding the symbol of #08, the RBs other than the RB of #020, that is, the consecutive RBs of #000 to #019 and the consecutive RBs after #021 are displayed in a color (a color different from the first color to the fifth color) indicating a state of not receiving any signal. Similarly, the consecutive RBs after #004 corresponding to symbols of #09 to #13 are also displayed in the fifth color.

According to the display form of the power Map display area 44 on the analysis result screen 40 shown in FIG. 6, for respective signals (PUSCH, PUCCH0, PUCCH1) corresponding to the reference characters S, C0, C1, it is possible to easily grasp how much power is output in which RB area in which symbol.

Here, for example, when symbols and RBs represented by any of the first to third colors do not present on the power Nap display area 44, it is possible to grasp that respective signals (PUSCH, PUCCH0, PUCCH1) expected to be received are not transmitted according to the schedule of the pseudo base station. Thus, the operator can easily specify a problem that the expected signal is not received on schedule, and can quickly deal with the problem.

Similarly, according to the display form of the power Nap display area 44, it is possible to grasp a state in which no signal is received for the RB of #020 of the symbol of #08 and the continuous RBs of #000 to #019 of the symbol of #08.

Further, according to the display form of the power Map display area 44, since there is no area displayed in the fifth color, it can also be seen that the signal identified by the reference character O corresponding to the color band 45e to which the fifth color is assigned, that is, the signal corresponding to the above-described Other (the signal not included in the schedule in the pseudo base station) is not transmitted from the pseudo base station.

From a different point of view, when the signal corresponding to the above-described Other is unnecessarily transmitted from the pseudo base station, the signal corresponding to the Other on the power Map display area 44 is displayed in the fifth color corresponding to the symbol and RBs being received. In this case, the operator can specify that the signal is output outside the standby range, and in turn, can quickly deal with this problem.

As described above, the base station simulator 10 according to the present embodiment includes a reception unit 21a that receives a signal to be measured modulated by an OFDM method; an analog signal processing unit 22 that calculates signal data of the signal to be measured received by the reception unit 21a; a data analysis unit 27c that calculates power of the signal data for each frequency in each time, based on the signal data; and an analysis result display unit 28c that displays a distribution of the power of the signal data on a time axis and a frequency axis.

With this configuration, the base station simulator 10 according to the present embodiment can grasp the reception status of the signal data for each frequency in each time domain, by checking the power distribution of the signal data displayed on the time axis and the frequency axis, which makes it easier to specify the problem related to the occurrence of an abnormality when the abnormality occurs.

In the base station simulator 10 according to the present embodiment, the time axis has a symbol forming a predetermined slot as a unit, and the frequency axis has a resource block as a unit.

With this configuration, the base station simulator 10 according to the present embodiment can grasp the reception status for each resource block in each symbol of the signal data by checking the power distribution of the displayed signal data, and can quickly grasp the problematic symbols and resource blocks when an abnormality occurs.

In the base station simulator 10 according to the present embodiment, the distribution of the power may be displayed in a predetermined shade of color. With this configuration, the base station simulator 10 according to the present embodiment can easily grasp the reception status for each resource block in each symbol of the signal data by checking the power distribution of the displayed signal data, by the shade of color.

In the base station simulator 10 according to the present embodiment, the distribution of the power is displayed in a plurality of colors corresponding to the power values.

With this configuration, the base station simulator 10 according to the present embodiment can grasp the power value for each resource block in each symbol of the signal data by checking the power distribution of the displayed signal data, by the shade of the color displayed, which makes it easier to specify the problem when an abnormality occurs.

In the base station simulator 10 according to the present embodiment, the power magnitudes of signals of PUSCH, PUCCH0, PUCCH1, and PUCCH2 waiting in the same slot and other signals assigned to the outside the reception standby range other than the signals may be displayed in shades of the plurality of colors displaying the power distribution.

With this configuration, the base station simulator 10 according to the present embodiment can easily specify problems such as other signals being output outside the standby range, by checking the power distribution of the signal data displayed.

The base station simulator 10 according to the present embodiment further includes a trigger detection unit 25 that outputs a trigger signal at a predetermined timing when a predetermined trigger condition is satisfied, and an IQ data memory unit 26 that receives a trigger signal and extracts and stores the IQ data in the predetermined section corresponding to a predetermined timing from the signal data, in which the data analysis unit 27c calculates the power of the signal data in a predetermined section extracted by the IQ data memory unit 26, and the analysis result display unit 28c displays a distribution of the power for the signal data in the predetermined section extracted by the IQ data memory unit 26. The data analysis unit 27c constitutes the power calculation unit of the present invention together with the function of synchronizing the timing with the slots.

With this configuration, the base station simulator 10 according to the present embodiment can analyze only the signal data in a predetermined section satisfying the trigger condition to display the analysis result, and checks the power distribution of the displayed signal data, which makes it easier to specify the problem related to the occurrence of an abnormality when an abnormality occurs in the signal data in the predetermined section.

A signal analysis result display method according to the present embodiment includes a reception step S12 of receiving a signal to be measured modulated by an OFDM method; a signal data calculation step S13 of calculating signal data of the signal to be measured received in the reception step; a power calculation step S19 of calculating power of the signal data for each frequency in each time based on the signal data; and a display step S21 of displaying a distribution of the power of the signal data on a time axis and a frequency axis, on the analysis result display unit 28c.

With this configuration, the signal analysis result display method according to the present embodiment, by using the base station simulator (signal analysis device) to which the present method is applied, can grasp the reception status of the signal data for each frequency in each time domain, by checking the power distribution of the signal data displayed on the time axis and the frequency axis, which makes it easier to specify the problem related to the occurrence of an abnormality when the abnormality occurs.

Second Embodiment

Next, the configuration of a signal analysis device 1 according to a second embodiment of the present invention will be described with reference to FIG. 9.

As shown in FIG. 9, the signal analysis device according to the present embodiment has a system configuration in which a base station simulator signal processing unit 10A and a base station simulator control device 50 are communicably connected via a hub 60. The base station simulator control device 50 is connected to the hub 60 by, for example, a network 65 using Ethernet (registered trademark).

The base station simulator signal processing unit 10A has a conceptual configuration equivalent to that of the base station simulator 10 (see FIG. 1) according to the first embodiment, except for some functional blocks. The base station simulator signal processing unit 10A according to the present embodiment operates as a base station simulator under the control of the base station simulator control device 50, and a pseudo base station control function unit that performs communication simulating a base station with the UE 70 (equivalent to the UE 70 in the first embodiment), a function unit that controls the analysis of IQ data, a function unit that displays the analysis result of IQ data, or the like are entrusted to the control functions of the base station simulator control device 50.

As shown in FIG. 9, the base station simulator signal processing unit 10A includes a transmission/reception unit 11 having a reception unit 11a and a transmission unit 11b, a signal data calculation unit 12, a trigger signal output unit 13, a signal extraction unit 14, a storage unit 15, and an external interface (I/F) unit 16.

In the base station simulator signal processing unit 10A, the reception unit 11a corresponds to the reception unit 21a of the base station simulator 10 according to the first embodiment. The signal data calculation unit 12 also corresponds to the analog signal processing unit 22 and the uplink layer processing unit 23. The trigger signal output unit 13 also corresponds to the trigger detection unit 25. The signal extraction unit 14 and the storage unit 15 also correspond to the IQ data memory unit 26. The external interface (I/F) unit 16 is interface means for transmitting and receiving signals to and from the hub 60.

The base station simulator control device 50 is composed of, for example, a computer device such as a personal computer (PC), and functions as a control PC that comprehensively controls various control operations of the base station simulator signal processing unit 10A for testing the UE 70. As shown in FIG. 9, the base station simulator control device 50 includes a control unit 51, an IQ data analysis unit 52, an external interface (I/F) unit 53, a display unit 54, and an operation unit 55.

In the base station simulator control device 50, the control unit 51 has a control function equivalent to that of the control unit 20 of the base station simulator 10 according to the first embodiment. That is, the control unit 51 includes a pseudo base station control unit 51a, a trigger setting unit 51b, an analysis control unit 51c, a display control unit 51d, and a subcarrier interval setting unit 51e respectively equivalent to the pseudo base station control unit 20a, the trigger setting unit 20b, the analysis control unit 20c, the display control unit 20d, and the subcarrier interval setting unit 20e in the control unit 20 of the base station simulator 10 according to the first embodiment. Further, in the base station simulator control device 50, the IQ data analysis unit 52 is equivalent to the IQ data analysis unit 27 of the base station simulator 10 according to the first embodiment. The display unit 54 and the operation unit 55 are equivalent to the display unit 28 and the operation unit 29, respectively. The external interface (I/F) unit 53 is interface means for transmitting and receiving signals to and from the hub 60 via the network 65.

In the signal analysis device 1 having the system configuration shown in FIG. 9, the base station simulator signal processing unit 10A and the base station simulator control device 50 operate as follows, respectively. The reception unit 11a receives the signal to be measured transmitted from the UE 70 (see step S12 in FIG. 4). The signal data calculation unit 12 converts the signal to be measured into a digital signal and executes a process of calculating the signal data (see step S13 in FIG. 4). The trigger signal output unit 13 outputs a trigger signal at a predetermined timing when a predetermined trigger condition is satisfied (see step S17 in FIG. 4). Upon receiving the trigger signal, the signal extraction unit 14 extracts IQ data in a predetermined section according to a predetermined timing from the signal data calculated by the signal data calculation unit 12 (see step S18 in FIG. 4). Specifically, IQ data in a predetermined section is stored in the storage unit 15 composed of the ring buffer memory. Then, in the base station simulator control device 50, the IQ data analysis unit 52 executes an analysis process of IQ data in a predetermined section stored in the ring buffer memory (see step S19 in FIG. 4). Further, the display control unit 51*d* controls the display unit 54 to display the analysis result of the IQ data by the IQ data analysis unit 52 (see step S20 in FIG. 4).

In particular, in the signal analysis device 1, in the process of step S19, a process (analysis process) of calculating the power of the signal data of the signal to be measured for each frequency (RB) in each time (symbol) is executed. Further, in the process of S20, the display control unit 51*d* controls the display unit 54 so as to display the power distribution of each signal on the time axis and the frequency axis for each signal, in the power Nap display area 44, by using the analysis result screen 40. This signal analysis and analysis result display processes are performed in the same manner as in the base station simulator 10 according to the first embodiment (see FIG. 8).

As described above, in the signal analysis device according to the second embodiment, the base station simulator signal processing unit 10A and the base station simulator control device 50 cooperate as a system to implement the IQ data analysis processing function and the analysis result display processing function similar to that of the single base station simulator 10 according to the first embodiment. That is, in the signal analysis device 1 according to the present embodiment, the signal analysis function of setting a trigger condition, outputting a trigger signal in a communication state satisfying the trigger condition, acquiring and analyzing IQ data in a predetermined range in the PRY layer, and calculating the power of the IQ data (signal data of the signal to be measured) for each RB (frequency) in each symbol (time) in the frame configuration of the signal data at this time, and the display control function of displaying distribution of the power of the signal data on the frequency axis and the time axis, on the display unit 54, based on the calculation result are the same as the functions of the base station simulator 10 according to the first embodiment. Thus, the signal analysis device 1 according to the second embodiment can be expected to have the same effect as the effect of the base station simulator 10 according to the first embodiment.

Further, the signal analysis device 1 according to the present embodiment has a configuration in which the signal extraction unit 14 (IQ data memory unit) and the IQ data analysis unit 52 are connected by a wired cable. With this configuration, the signal analysis device 1 according to the present embodiment can connect the same type of signal analysis devices in parallel when the number of base stations further increases, and can cope with the case where the signals to be transmitted and received increase.

In each of the above embodiments, the operation mode of 5G NR is illustrated, but the present invention can also be applied to an operation mode in which 5G PR and LTE are mixed, or a future operation mode in which 5G PR and the next communication standard are mixed.

INDUSTRIAL APPLICABILITY

As described above, the signal analysis device and the signal analysis result display method according to the present invention have an effect capable of easily specifying the cause of a problem while checking the power distribution for a frequency in a time domain, with respect to a signal data of a signal to be measured, and are useful in general for signal analysis devices and signal analysis result display methods that analyze a signal to be measured transmitted from a mobile terminal.

DESCRIPTION OF REFERENCE NUMERALS AND SIGNS

1 Signal analysis device
10 Base station simulator
10A Base station simulator signal processing device
11*a* Reception unit
12 Signal data calculation unit
13 Trigger signal output unit
14 Signal extraction unit
21*a* Reception unit
22 Analog signal processing unit (signal data calculation unit)
25 Trigger detection unit (trigger signal output unit)
26 IQ data memory unit (signal extraction unit)
27*c* Data analysis unit (power calculation unit)
28*c* Analysis result display unit (display unit)
52 IQ data analysis unit (power calculation unit)
54 Display unit
70 UE (User Equipment: mobile terminal)

What is claimed is:

1. A signal analysis device comprising:
   a reception unit that receives a signal to be measured modulated by an OFDM method;
   a signal data calculation unit that calculates signal data of the signal to be measured received by the reception unit;
   a power calculation unit that calculates power of the signal data for each frequency in each time based on the signal data; and
   a display unit that displays a distribution of the power of the signal data on a time axis and a frequency axis.

2. The signal analysis device according to claim 1, wherein
   the time axis has a symbol forming a predetermined slot as a unit, and
   the frequency axis has a resource block as a unit.

3. The signal analysis device according to claim 2, wherein
   the distribution of the power is displayed in a predetermined shade of color.

4. The signal analysis device according to claim 2, wherein
   the distribution of the power is displayed in a plurality of colors corresponding to values of the power.

5. The signal analysis device according to claim 2, wherein
   power magnitudes of signals of PUSCH, PUCCH0, PUCCH1, and PUCCH2 waiting in the same slot and other signals assigned to an outside of a reception standby range other than the signals are displayed in shades of a plurality of colors displaying the distribution of the power.

6. The signal analysis device according to claim 2, further comprising:
   a trigger signal output unit that outputs a trigger signal at a predetermined timing when a predetermined trigger condition is satisfied; and
   a signal extraction unit that receives the trigger signal, and extracts IQ data in a predetermined section according to the predetermined timing from the signal data, wherein the power calculation unit calculates power for signal data of the predetermined section extracted by the signal extraction unit, and the display unit displays a power distribution for the signal data of the predetermined section extracted by the signal extraction unit.

7. The signal analysis device according to claim 1, wherein the distribution of the power is displayed in a predetermined shade of color.

8. The signal analysis device according to claim 1, wherein the distribution of the power is displayed in a plurality of colors corresponding to values of the power.

9. The signal analysis device according to claim 1, wherein power magnitudes of signals of PUSCH, PUCCH0, PUCCH1, and PUCCH2 waiting in the same slot and other signals assigned to an outside of a reception standby range other than the signals are displayed in shades of a plurality of colors displaying the distribution of the power.

10. The signal analysis device according to claim 1, further comprising:

a trigger signal output unit that outputs a trigger signal at a predetermined timing when a predetermined trigger condition is satisfied; and a signal extraction unit that receives the trigger signal, and extracts IQ data in a predetermined section according to the predetermined timing from the signal data, wherein the power calculation unit calculates power for signal data of the predetermined section extracted by the signal extraction unit, and the display unit displays a power distribution for the signal data of the predetermined section extracted by the signal extraction unit.

11. A signal analysis result display method comprising:

a reception step of receiving a signal to be measured modulated by an OFDM method;

a signal data calculation step of calculating signal data of the signal to be measured received in the reception step;

a power calculation step of calculating power of the signal data for each frequency in each time based on the signal data; and a display step of displaying a distribution of the power of the signal data on a time axis and a frequency axis, on a display unit.

\* \* \* \* \*